(No Model.)
W. LOCKWOOD.
Springs for Pistons.
No. 233,262. Patented Oct. 12, 1880.
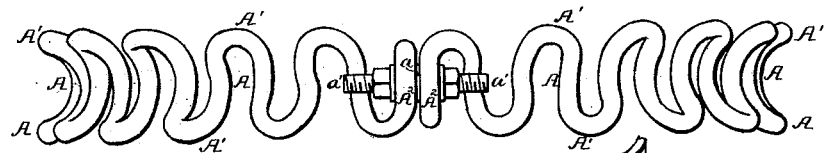
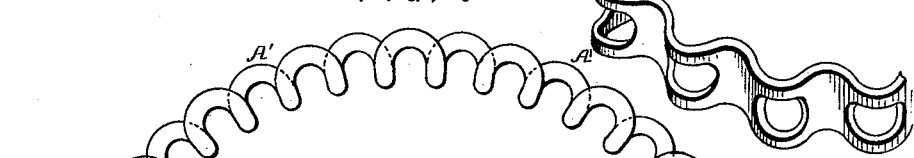
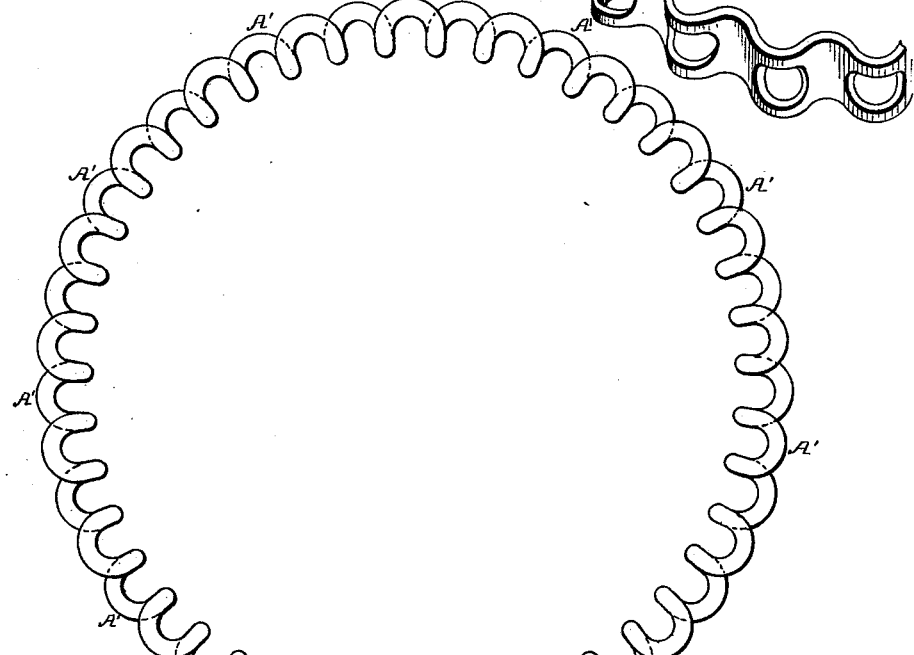
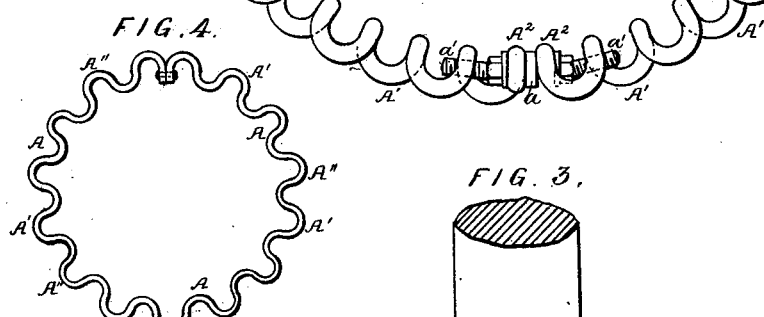
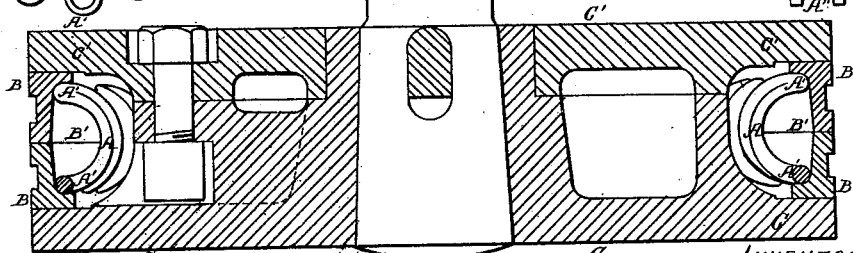
WITNESSES
H. L. Fulenwider
Henry Howson Jr.
INVENTOR
William Lockwood
by his Attorneys
Howson and Son

UNITED STATES PATENT OFFICE.

WILLIAM LOCKWOOD, OF SHEFFIELD, ENGLAND, ASSIGNOR OF ONE-HALF OF HIS RIGHT TO JOHN TURNBULL, JR., OF GLASGOW, SCOTLAND.

SPRING FOR PISTONS.

SPECIFICATION forming part of Letters Patent No. 233,262, dated October 12, 1880.

Application filed June 2, 1880. (No model.) Patented in England August 13, 1877.

*To all whom it may concern:*

Be it known that I, WILLIAM LOCKWOOD, of Sheffield, in the county of York, England, and a subject of the Queen of Great Britain, have invented a new and useful Improvement in Springs for Pistons, (for which I obtained a patent in Great Britain, No. 3,078, dated 13th August, 1877,) of which the following is a specification.

This invention relates to a new or improved construction of springs for the packing-rings of pistons, which is designed to render pistons fitted therewith perfectly tight and specially suitable for steam, air, and other engines and pumps.

The peculiar conformation of the improved spring and its application to the piston of a steam-engine are illustrated in the accompanying drawings, in which—

Figure 1 is a side elevation, and Fig. 2 a plan view, of the spring, while Fig. 3 is a vertical section of a steam-piston fitted with the spring. Figs. 4 and 5 are respectively a side elevation and plan of a slightly-modified form of the improved spring, and Fig. 6 a perspective view of a portion of the modified form of spring.

The principal feature of the invention consists in the construction and utilization of a peculiarly-formed spring, A, for distending the piston-rings B, and which may be made of steel or other suitable metal or material, of a round, square, oval, or other convenient section.

The spring is formed by being coiled in such a manner as to present in one view a series of contiguous horseshoes or semicircles, as seen in Fig. 2, and in end section, at right angles thereto, a single such figure in Fig. 3, and in regular undulating curves in elevation, as seen in Fig. 1. As thus formed the spring is bent to a circular shape, with the rounded parts $A'$ of the series of horseshoes or semicircles outward, as shown in Fig. 1, and its ends $A^2$ are secured and kept in position by means of a screwed pin or stud, $a'$, passing through eyes formed in these ends $A^2$, and held by nuts on each side or end of the screwed pin $a'$, or by other suitable means.

The diameter of the spring thus bent may be increased or lessened, and its pressure against the piston-rings B adjusted, as required, by uniting the spring ends $A^2$, with a washer, $a$, between, of greater or less thickness, as may be required, or by the use of an adjusting-nut on the pin $a'$.

The spring thus prepared is laid within the recess $B'$, formed for the packing-rings B, and the bends $A'$ of the series of horseshoes or semicircles press alternately against the upper and lower of such rings B in such a manner as to exert a side pressure against the flanges of the rings B, which bear against the piston-bottom C and cover $C'$, and keep them well up thereto, and also preserve a direct outward pressure around the circumference, tending to increase the diameter of the rings, by this means insuring a perfectly steam, air, or other fluid pressure tight piston.

For small pistons I employ a spring, A, of the modified form illustrated in Figs. 4 and 5, and this spring I make of ribbon or thin flat steel or other suitable metal or material, first perforating it at equal distances with holes $A''$, and then bending or corrugating it by any suitable means in such a manner as that every alternate bend $A'$ is perforated and the others solid, and then bending it to a circular shape with the perforated corrugations outward, as shown particularly in Fig. 5.

The ends of this spring may be connected by means of a pin, $a'$, riveted onto one end of the spring and projecting into a hole in the other end, or by other suitable means.

The action of this spring is precisely similar to that above described.

What I claim as new, and desire to secure by Letters Patent, is—

The combination of the bottom and cover of a piston and flanged piston-rings with a corrugated or bent spring, A, constructed substantially as described, and adapted to exert a pressure on the rings outward circumferentially and at the same time against the bottom and cover of the piston, as and for the purpose set forth.

In testimony whereof I have signed my name to this specification in the presence of two subscribing witnesses.

WILLIAM LOCKWOOD.

Witnesses:
WALLACE FAIRWEATHER,
JOHN MACDONALD.